US009799012B2

(12) United States Patent
Patel et al.

(10) Patent No.: US 9,799,012 B2
(45) Date of Patent: Oct. 24, 2017

(54) ELECTRONIC RECEIPT SYSTEM WITH SOCIAL MEDIA LINK AND RELATED SERVERS AND METHODS

(71) Applicant: FLEXRECEIPTS INC., Windermere, FL (US)

(72) Inventors: Jay Patel, Washington, DC (US); Tomas Diaz, Windermere, FL (US); Kiran Kshatriya, Falls Church, VA (US)

(73) Assignee: FLEXRECEIPTS INC., Orlando, FL (US)

( * ) Notice: Subject to any disclaimer, the term of this patent is extended or adjusted under 35 U.S.C. 154(b) by 420 days.

(21) Appl. No.: 14/451,908

(22) Filed: Aug. 5, 2014

(65) Prior Publication Data

US 2015/0025986 A1    Jan. 22, 2015

Related U.S. Application Data

(63) Continuation-in-part of application No. 13/251,480, filed on Oct. 3, 2011.
(Continued)

(51) Int. Cl.
| | | |
|---|---|---|
| *G06F 15/16* | (2006.01) | |
| *G06Q 20/04* | (2012.01) | |
| *G06Q 20/32* | (2012.01) | |
| *G06Q 50/00* | (2012.01) | |
| *G06Q 30/06* | (2012.01) | |
| *G06Q 20/20* | (2012.01) | |
| *G06Q 20/40* | (2012.01) | |
| *G06Q 30/02* | (2012.01) | |

(52) U.S. Cl.
CPC ....... *G06Q 20/0453* (2013.01); *G06Q 20/204* (2013.01); *G06Q 20/322* (2013.01); *G06Q 20/3278* (2013.01); *G06Q 20/40* (2013.01); *G06Q 30/0207* (2013.01); *G06Q 30/06* (2013.01); *G06Q 50/01* (2013.01)

(58) Field of Classification Search
None
See application file for complete search history.

(56) References Cited

U.S. PATENT DOCUMENTS

| 5,739,512 A | 4/1998 | Tognazzini |
|---|---|---|
| 7,552,087 B2 | 6/2009 | Schultz et al. |

(Continued)

FOREIGN PATENT DOCUMENTS

WO    03054753 A2    7/2003

*Primary Examiner* — Natisha Cox
(74) *Attorney, Agent, or Firm* — Allen, Dyer, Doppelt & Gilchrist P.A.

(57) ABSTRACT

An electronic receipt system may include a point-of-sale (POS) terminal having a near field communication (NFC) device for communicating with a mobile wireless communications device during a transaction for purchasing at least one item, and a server. The server may be for receiving a user identifier transmitted from the mobile communication device via the NFC device, verifying an enrollment status of the user identifier, based upon results of the verifying, generating an electronic receipt associated with the transaction, and generating a social media network link feature in the electronic receipt and associated with the item, the social media network link feature for sharing the purchase of the item on a corresponding social media network.

18 Claims, 4 Drawing Sheets

Related U.S. Application Data

(60) Provisional application No. 61/404,447, filed on Oct. 4, 2010.

(56) References Cited

U.S. PATENT DOCUMENTS

| | | | |
|---|---|---|---|
| 7,742,989 B2 | 6/2010 | Schultz | |
| 7,797,192 B2 | 9/2010 | Mitchell et al. | |
| 8,380,177 B2 | 2/2013 | Laracey | |
| 8,643,875 B2 | 2/2014 | Shapiro et al. | |
| 2001/0029484 A1* | 10/2001 | Schultz | G06Q 20/0453 705/39 |
| 2002/0188559 A1 | 12/2002 | Schultz | |
| 2003/0055733 A1 | 3/2003 | Marshall et al. | |
| 2003/0126020 A1 | 7/2003 | Smith et al. | |
| 2004/0225567 A1 | 11/2004 | Mitchell et al. | |
| 2005/0240482 A1 | 10/2005 | Ohkawa et al. | |
| 2006/0258397 A1 | 11/2006 | Kaplan et al. | |
| 2008/0208744 A1 | 8/2008 | Arthur et al. | |
| 2009/0070228 A1 | 3/2009 | Ronen | |
| 2009/0259499 A1 | 10/2009 | Bhojwani et al. | |
| 2009/0271265 A1 | 10/2009 | Lay et al. | |
| 2009/0271322 A1 | 10/2009 | Lay et al. | |
| 2009/0292591 A1 | 11/2009 | Schultz et al. | |
| 2010/0100434 A1 | 4/2010 | Sock | |
| 2010/0114731 A1 | 5/2010 | Kingston et al. | |
| 2010/0133334 A1 | 6/2010 | Vadhri | |
| 2010/0332265 A1 | 12/2010 | Smith | |
| 2011/0106597 A1 | 5/2011 | Ferdman et al. | |
| 2011/0137742 A1 | 6/2011 | Parikh | |
| 2011/0137803 A1 | 6/2011 | Willins | |
| 2011/0282734 A1 | 11/2011 | Zurada | |
| 2012/0006891 A1 | 1/2012 | Zhou et al. | |
| 2012/0029998 A1 | 2/2012 | Aversano et al. | |
| 2012/0089471 A1 | 4/2012 | Comparelli | |
| 2012/0158482 A1 | 6/2012 | Paradise et al. | |
| 2012/0205436 A1 | 8/2012 | Thomas et al. | |
| 2012/0209686 A1 | 8/2012 | Horowitz et al. | |
| 2012/0226530 A1 | 9/2012 | Gebb et al. | |
| 2012/0284130 A1 | 11/2012 | Lewis et al. | |
| 2012/0290478 A1 | 11/2012 | Crofts et al. | |
| 2013/0019284 A1 | 1/2013 | Pacyga et al. | |
| 2013/0030879 A1* | 1/2013 | Munjal | G06Q 30/0224 705/7.42 |
| 2013/0173367 A1* | 7/2013 | Beighley, Jr. | G06Q 30/0214 705/14.16 |
| 2013/0217721 A1* | 8/2013 | Lo | C12Q 1/6886 514/300 |
| 2013/0218721 A1* | 8/2013 | Borhan | G06Q 20/322 705/26.41 |
| 2013/0256403 A1 | 10/2013 | MacKinnon | |
| 2013/0297414 A1* | 11/2013 | Goldfarb | G06Q 40/00 705/14.51 |
| 2014/0006198 A1 | 1/2014 | Daly et al. | |
| 2014/0025584 A1 | 1/2014 | Liu et al. | |
| 2014/0122220 A1 | 5/2014 | Bradley et al. | |

* cited by examiner

ELECTRONIC RECEIPT SYSTEM WITH SOCIAL MEDIA LINK AND RELATED SERVERS AND METHODS

RELATED APPLICATIONS

This application is a continuation-in-part application of copending U.S. patent application Ser. No. 13/251,480 filed Oct. 3, 2011, which application claims priority to U.S. Provisional Patent Application Ser. No. 61/404,447, filed Oct. 4, 2010, the entire subject matter of these applications is incorporated herein by reference in its entirety.

TECHNICAL FIELD

The present disclosure relates to the field of communication systems, and, more particularly, to an electronic receipt system and related methods.

BACKGROUND

Paper receipts are used by most merchants at their point-of-sale (POS) or checkout to confirm the purchase of goods or services and are later used by consumers to perform returns, exchanges, rebates, and claims. However, the thermal paper requirements for providing paper receipts pose serious environmental threats, including deforestation and high levels of water utilization. Furthermore, in today's digital environment, having to physically store a paper receipt is both inconvenient and inefficient for both the consumer and retailer. To reduce the use of paper receipts while still maintaining the ability to provide consumers with confirmation for the purchase of goods or services, electronic receipt systems have been introduced to the market.

In one such electronic receipt system, when a consumer arrives at a POS terminal to purchase a good or service, the consumer may request an electronic receipt or a paper receipt. If an electronic receipt is selected, the electronic receipt system validates the consumer's identity. To this end, the consumer and/or a salesperson performs a particular action at the POS terminal, such as swiping a magnetic card (e.g., credit card, debit card, member card), scanning a barcode, or manually entering a specific series of predefined characters (e.g., telephone number, e-mail address). Once the consumer's identity is validated, an electronic receipt is generated for storage and/or processing in association with the consumer's account, for instance, in an online database.

In another electronic receipt system, near field communication (NFC) can be used to transfer an electronic receipt between an NFC communications device at the POS and an NFC-enabled mobile phone. Alternatively, a camera on a consumer's mobile phone is used to capture a photograph of a digital receipt. In both of these cases, the electronic receipt is then stored in a memory on the mobile phone.

NFC is a standards-based short-range wireless connectivity technology that allows for simple, fast, and secure data transfer between electronic devices. NFC is based upon existing international standards recognized by the ISO/IEC (International Organization for Standardization/International Electrotechnical Commission), ETSI (European Telecommunication Standards Institute), and ECMA (European association for standardizing information and communication systems). NFC is compatible with contactless infrastructure that is already in place in diverse locations throughout the world. With the advent of NFC-integrated mobile devices such as mobile phones, it is possible to entirely eliminate the need for an individual to carry a magnetic card or scannable barcode card, or to remember and manually input a series of characters, for a variety of retail and other situations. Instead, an NFC-enabled mobile device can function as a contactless card in conjunction with a contactless card reader for identifying an individual at a POS.

SUMMARY

In view of the foregoing background, it is therefore an object of the present disclosure to provide an electronic receipt system that is efficient and robust.

This and other objects, features, and advantages in accordance with the present disclosure are provided by an electronic receipt system comprising a POS terminal having a NFC device for communicating with a mobile wireless communications device during a transaction for purchasing at least one item, and a server communicating with the POS terminal and comprising a processor and memory associated. The processor and memory may be for receiving a user identifier transmitted from the mobile communication device via the NFC device, verifying an enrollment status of the user identifier, based upon results of the verifying, generating an electronic receipt associated with the transaction, and generating at least one social media network link feature in the electronic receipt and associated with the at least one item, the at least one social media network link feature for sharing the purchase of the at least one item on a corresponding at least one social media network. Advantageously, the electronic receipt system may permit the user to readily share the purchase of the at least one item on a social media network.

In some embodiments, the processor and memory may be for generating a merchant table associated with a plurality of merchants, the merchant table including a plurality of item entries, each item entry being associated with a respective potential item for purchase. Each item entry may comprise, for example, a product identification number for the respective potential item for purchase, a merchant identification number for a merchant selling the respective potential item for purchase, and a Uniform Resource Identifier (URI) or uniform resource locater (URL) for accessing the respective potential item for purchase on a website of the merchant selling the respective potential item.

Additionally, the generating of the at least one social media network link feature may comprise searching the merchant table for at least one item entry associated with the at least one item. The generating of the merchant table may comprise crawling a plurality of websites associated with a corresponding plurality of merchants and/or interfacing with a Product Database (i.e., Merchant Product Database, Manufacturer Product Database) that provides item information. The at least one social media network link feature may comprise a link to a social media page for a merchant associated with the transaction, a product description, and an image of the at least one item.

Another aspect is directed to a server in communication with a POS terminal having an NFC device for communicating with a mobile wireless communications device during a transaction for purchasing at least one item. The server may include a processor and memory associated therewith for receiving a user identifier transmitted from the mobile communication device via the NFC device, verifying an enrollment status of the user identifier, based upon results of the verifying, generating an electronic receipt associated with the transaction, and generating at least one social media network link feature in the electronic receipt and associated with the at least one item, the at least one social media network link feature for sharing the purchase of the at least one item on a corresponding at least one social media network.

Another aspect is directed to a method for operating an electronic receipt system comprising a POS terminal having a NFC device for communicating with a mobile wireless communications device during a transaction for purchasing at least one item, and a server communicating with the POS terminal. The method may include using a processor and memory associated therewith for receiving a user identifier transmitted from the mobile communication device via the NFC device, using the processor and memory associated therewith for verifying an enrollment status of the user identifier, and using the processor and memory associated therewith for based upon results of the verifying, generating an electronic receipt associated with the transaction. The method may include using the processor and memory associated therewith for generating at least one social media network link feature in the electronic receipt and associated with the at least one item, the at least one social media network link feature for sharing the purchase of the at least one item on a corresponding at least one social media network.

DETAILED DESCRIPTION

Figure 1:
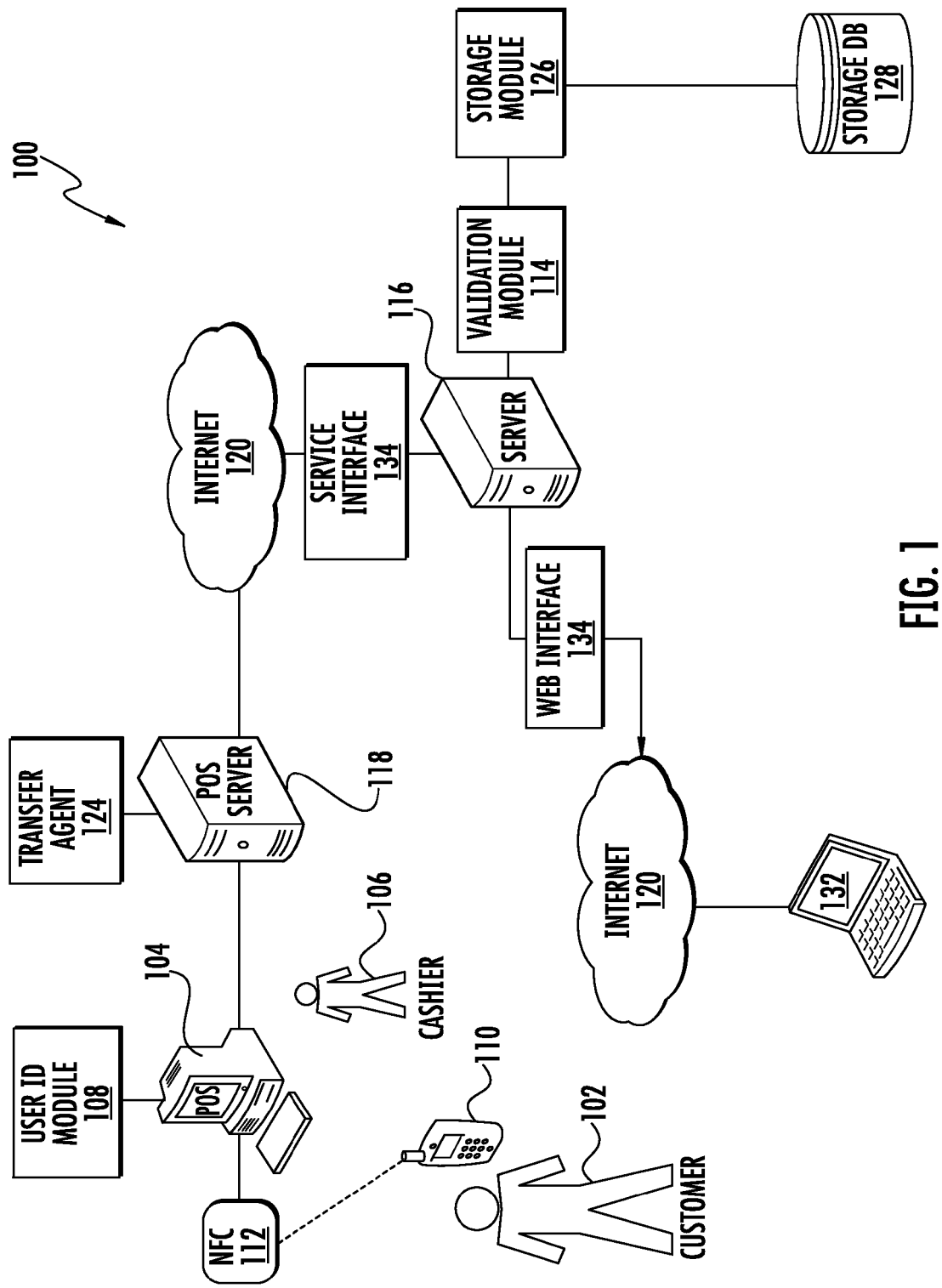
FIG. 1 is a schematic block diagram of an electronic receipt system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and prime notation is used to indicate similar elements in alternative embodiments.

A general aspect, a method includes receiving, at a user identification module of an electronic receipt system in electronic communication with a POS terminal, a user identifier transmitted from a mobile communication device to a NFC enabled communication device associated with the POS terminal. The method also includes verifying, by a validation module of the electronic receipt system, an enrollment status of the user identifier; and based upon results of the verifying, transmitting, by a transfer module of the electronic receipt system, the user identifier and data characterizing an electronic receipt to a receipt storage module of the electronic receipt system.

Embodiments may include one or more of the following. The method further includes storing the data characterizing the electronic receipt in association with the user identifier in a database associated with the receipt storage module.

Verifying the enrollment status of the user identifier includes receiving a communication from the user identification module including the user identifier, determining the enrollment status of the user identifier and transmitting a communication to the user identification module indicative of the enrollment status of the user identifier.

The method further includes, based upon the status of the user identifier, enabling enrollment of the user identifier in the electronic receipt system. Enabling enrollment of the user identifier includes generating a temporary account in the electronic receipt system associated with the user identifier.

Transmitting the user identifier and the electronic receipt includes generating a message including the user identifier and data associated with the electronic receipt; and transmitting the message to the receipt storage module. The method, wherein the message is at least one of an XML message, a text format message, an image, or a JavaScript Object Notation (JSON), for example. Data associated with the electronic receipt include at least one of an identifier of a product, an identifier of a merchant, a date, a purchase price, and a receipt number.

In another general aspect, an electronic receipt system includes a user identification module in electronic communication with a POS terminal, the user identification module configured to receive a user identifier transmitted from a mobile communication device to a NFC enabled communication device associated with the POS terminal. The electronic receipt system also includes a validation module configured to verify an enrollment status of the user identifier in the electronic receipt system; a transfer module configured to transmit the user identifier and an electronic receipt based upon the enrollment status of the user identifier; and a receipt storage module configured to store the user identifier and the electronic receipt in a database.

Embodiments may include one or more of the following. The user identification module and the transfer module are co-located in a first location and the validation module and the receipt storage module are co-located in a second location.

The electronic receipt system further includes a service interface configured to receive data from the user identification module and the transfer module. The user identification module and the transfer module are co-located in a first location; the validation module, the receipt storage module, and the service interface are co-located in a second location.

The electronic receipt system further includes a web interface configured to enable a user of the electronic receipt system to access the electronic receipt stored in the receipt storage module. The user identification module and the transfer module are co-located in a first location; and the validation module, the receipt storage module, and the web interface are co-located in a second location.

The systems and methods described herein have a number of advantages. In particular, transmitting a customer identifier via a NFC equipped mobile phone is efficient and convenient and eliminates the possibility of the customer losing an identification card or forgetting a username or password.

Other features and advantages of the invention are apparent from the following description and from the claims.

Electronic Receipt Generation

Figure 2:
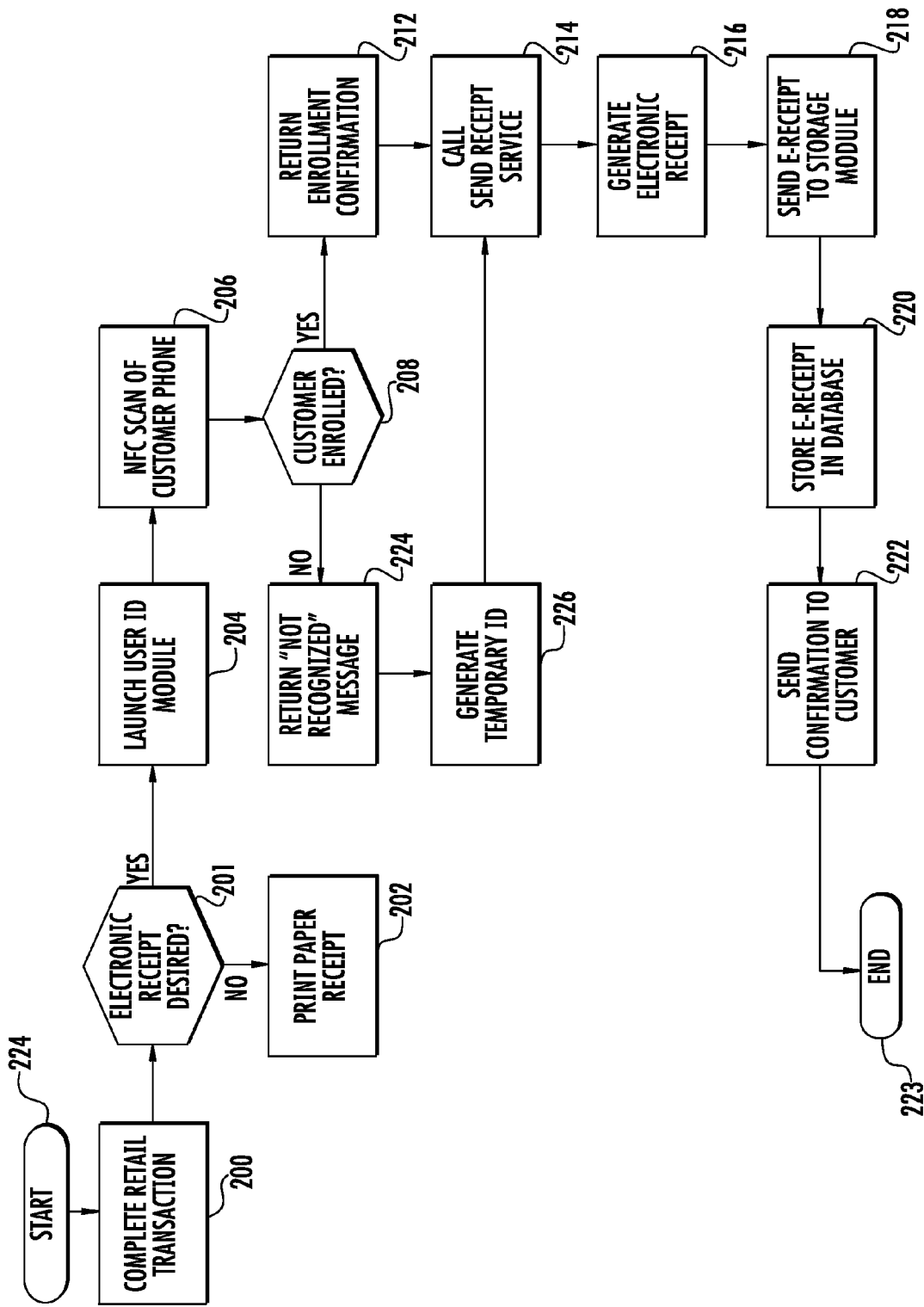
FIG. 2 is a flowchart of a method of operating a POS, according to the present disclosure.

Referring to FIGS. 1-2, an electronic receipt system 100 generates an electronic receipt for a customer's retail transaction and stores the electronic receipt in association with the customer's account in the electronic receipt system. When a customer 102 performs a transaction (e.g., a purchase of goods or services) at a merchant's POS terminal 104 (steps 224 and 200), the customer is asked whether an electronic receipt is desired (step 201). In some instances, a cashier 106 asks customer 102 whether he prefers a paper receipt and/or an electronic receipt. In other instances, the customer is asked via a display on a display screen at the POS terminal. If customer 102 does not want an electronic receipt, a paper receipt is printed for the transaction (step 202).

If customer 102 desires an electronic receipt, a user identification (ID) module 108 is launched at POS terminal 104 (step 204). In some cases, user ID module 108 is integrated with the POS operating system and thus is automatically launched when the customer indicates that an electronic receipt is preferred. In other cases, user ID module 108 is launched manually, e.g., by cashier 106 pressing an appropriate button on a terminal hosting the user ID module.

Once user ID module 108 is launched, customer 102 positions a NFC-enabled mobile communication device (e.g., a mobile phone) 110 proximal to a contactless NFC-enabled reader 112 at POS terminal 104 to identify himself to the electronic receipt system (step 206). A customer identifier is read from mobile phone 110 by NFC reader and transferred to user ID module 108. In some cases, NFC reader 112 is a peripheral device in electronic communication with POS terminal 104; in other cases, NFC reader 112 is integrated into the POS terminal. In general, NFC reader 112 can be any type of contactless NFC-enabled reader capable of receiving information communicated by any type of NFC-enabled device.

To validate an enrollment status of the customer identifier in the electronic receipt system (step 208), user ID module 108 transmits the customer identifier to a service interface 134 of electronic receipt system 100. Service interface 134 passes the incoming data to a validation module 114 hosted on a server 116 of the electronic receipt system 100. Server 116 is typically located physically distant from POS terminal 104; communication between user ID module 108 and validation module 114 occurs via a POS server 118 connected to the Internet 120.

Validation module 114 accesses a storage database 128 that includes a list of customer identifiers enrolled in electronic receipt system 100. In some embodiments, the customer identifier itself is a username in the electronic receipt system. In other embodiments, storage database 128 includes a mapping between the customer identifier and a username or another account identifier.

If the customer identifier is verified as being enrolled in electronic receipt system 100, validation module 114 returns an enrollment confirmation message to user ID module 108 (step 212). If the customer identifier is not the username, the enrollment confirmation message may also include the username or other account identifier.

Upon receipt of the enrollment confirmation message, user ID module 108 instructs POS terminal 104 to call a "send receipt" service operated by a transfer agent 124 (step 214). The "send receipt" service causes a message to be generated including the electronic receipt for the retail transaction, in a format such as an XML message, a text format message, an image, or a JSON message, by a transfer agent 124 hosted on POS server 118 (step 216). The electronic receipt includes the customer identifier and/or username or other identifier and transaction details such as, e.g., an identifier of a product, such as a brand and model number; product details, such as a category or sub-category, industry, or department; an identifier of a merchant; a transaction date; a purchase price; a receipt number; and the merchant's terms and conditions or return policy. The electronic receipt is securely sent via service interface 134 to the validation module 114, which parses and validates the receipt data. Once validated, the electronic receipt is then directed to a storage module 126 hosted on server 116 (step 218). Storage module 126 stores the transaction details in the customer's account in storage database 128 (step 220). In some cases, such as if desired by the customer, a storage confirmation message can be sent as an email or Short Message Service (SMS) message to the customer's email account or mobile phone alerting the customer of the success or failure of the data transfer (steps 222 and 223). Once the electronic receipt is stored in database 128, the receipt can be accessed via a website 132.

If the customer identifier is not present in the storage database 122 (step 208), validation module 114 returns a message to user ID module 108 indicating that the customer identifier is not recognized (step 224). Upon receipt of this message, Validation module 114 generates a unique temporary random identifier for the customer (step 226) and transmits the temporary identifier to the customer. The temporary identifier can be communicated in any of a number of ways, such as, for instance, printing the temporary identifier on a paper receipt, emailing the temporary identifier or sending a text message including the temporary identifier to the customer (provided the customer is willing to provide his email address or phone number), transmitting the temporary identifier by NFC to mobile phone 110, or displaying the temporary identifier on a display screen at POS terminal 104. POS terminal then calls the "send receipt" service (step 214) operated by transfer agent 124 to generate an electronic receipt including the temporary identifier and transaction details (step 216). The electronic receipt is sent to storage module 126 (step 218), where the transaction details are stored in a temporary account associated with the temporary identifier (step 220). At a later time, the customer can then access the electronic receipt system 100 via website 132 to enroll in the system, create an account, and access the receipt.

In the embodiment described above, transfer agent 124 generates and sends electronic receipts in real time, i.e., after each retail transaction. In an alternative embodiment, each electronic receipt is generated in real time but receipts are sent to storage module 126 in batches, for instance at periodic intervals or after a designated number of retail transactions have taken place.

In another alternative embodiment, the customer is not explicitly asked whether an electronic receipt is desired. Rather, to indicate that an electronic receipt is desired, the customer scans a magnetic swipe card, keycard, mobile CardStar, or other medium including a barcode associated with the electronic receipt system. Alternatively, the customer positions his mobile communication device proximal to reader 112, causing user ID module 108 to be launched and causing the customer identifier to be read from the mobile communication device.

In general, the user ID module 108 and the transfer agent 124, as well as other components described below, are designed to conform to existing Associate Retail Technology Standards (ARTS) standards in order to facilitate integration into the variety of existing POS hardware systems at retail sites.

In some embodiments, server 116 is a single server. In other instances, server 116 represents a group of multiple servers, each server serving a particular element of the electronic receipt system (e.g., an applications server, a web server, and/or a database server).

In the embodiment described above, a single storage database 128 stores all user data and electronic receipt data. In other embodiments, multiple databases are used. For instance, a first database may store user data and a second database may store electronic receipt data.

Web and Mobile Applications

Website 132 provides users of the electronic receipt system with access to their account in the electronic receipt system via a web interface 134. When a user accesses the website for the first time, the user is prompted to establish an account, including selecting a username and password for use when logging onto website 132. As used herein, the term "website" may also refer to a mobile/tablet application with similar functionality. Once enrolled, users can edit account information and add personal information such as gender, location, shopping preferences, credit card numbers, and loyalty card numbers. The user is also prompted to link his mobile phone to the account, e.g., by downloading a mobile application including the user's customer identifier, so that the customer identifier will be able to be transferred to the POS during a retail transaction. In some cases the username is the same as the customer identifier; in other cases, the username and the customer identifier are different.

Users can view and manipulate electronic receipts via website 132, including categorizing the receipts into various folders (pre-existing or user-defined), exporting receipts (in formats such as .csv, .xls, .pdf), and printing receipts. Flexible search options including search filters (based upon parameters such as date, retailer, or industry), category search, and sorting are available.

The electronic receipt system tracks each user's purchases at the universal product code (UPC), stock-keeping unit (SKU) level, and/or any other unique product identifier enabling the system to identify information such as price paid, date of purchase, quantity of items purchased, and coupons used. Using this information, optionally in combination with personal information such as gender or location, the electronic receipt system can identify and display promotions and coupons that may be of interest to a particular user. In addition, the electronic receipt system facilitates the searching of rebates available for products a user has purchased and provides a mechanism for submitting rebates via website 132. The Consumer Portal can also offer tracking of price guarantees, warranties, product registrations, feedback submissions, as well as various offers/promotions, surveys etc. The electronic receipt system will also track return periods, display a product return countdown for each returnable product, and send reminders when a product return period is about to expire. A merchant portal of website 132 provides merchants with access to all electronic receipts for their customers, enabling merchants to perform actions such as generating reports on purchases made by all electronic receipt customers. The Merchant Portal also allows Merchants to customize their email receipts: select templates, change labels, enable/disable social media links, add videos, add promotions, add product recommendations, add surveys. It also, provides email metrics including the deliverability of emails, number of opens, interaction rates (i.e., what parts of the receipt are being clicked on by users), how many times the same receipt is being opened, how long before it is opened etc. Moreover, it also allows Merchants to create and manage different offers/promotions campaigns, based on the electronic receipt data. Additionally, it also provides Merchants with Analytics dashboards based on the electronic receipt data.

A mobile application provides many of the functions available through website 132, including enrollment; viewing and searching of receipts; and display of promotions, rebates, and return periods. Using the mobile application, customers can view their electronic receipts in real time when a transaction is completed. In addition, the mobile application can display a receipt barcode on a customer's mobile phone; a retailer can scan the receipt barcode to retrieve and display receipt information on the retailer's POS terminal. In some embodiments, the mobile application displays a customer identifier barcode, which can be scanned at a POS terminal to transmit the customer identifier, thus allowing customers to receive electronic receipts from merchants without NFC readers.

Figure 3:
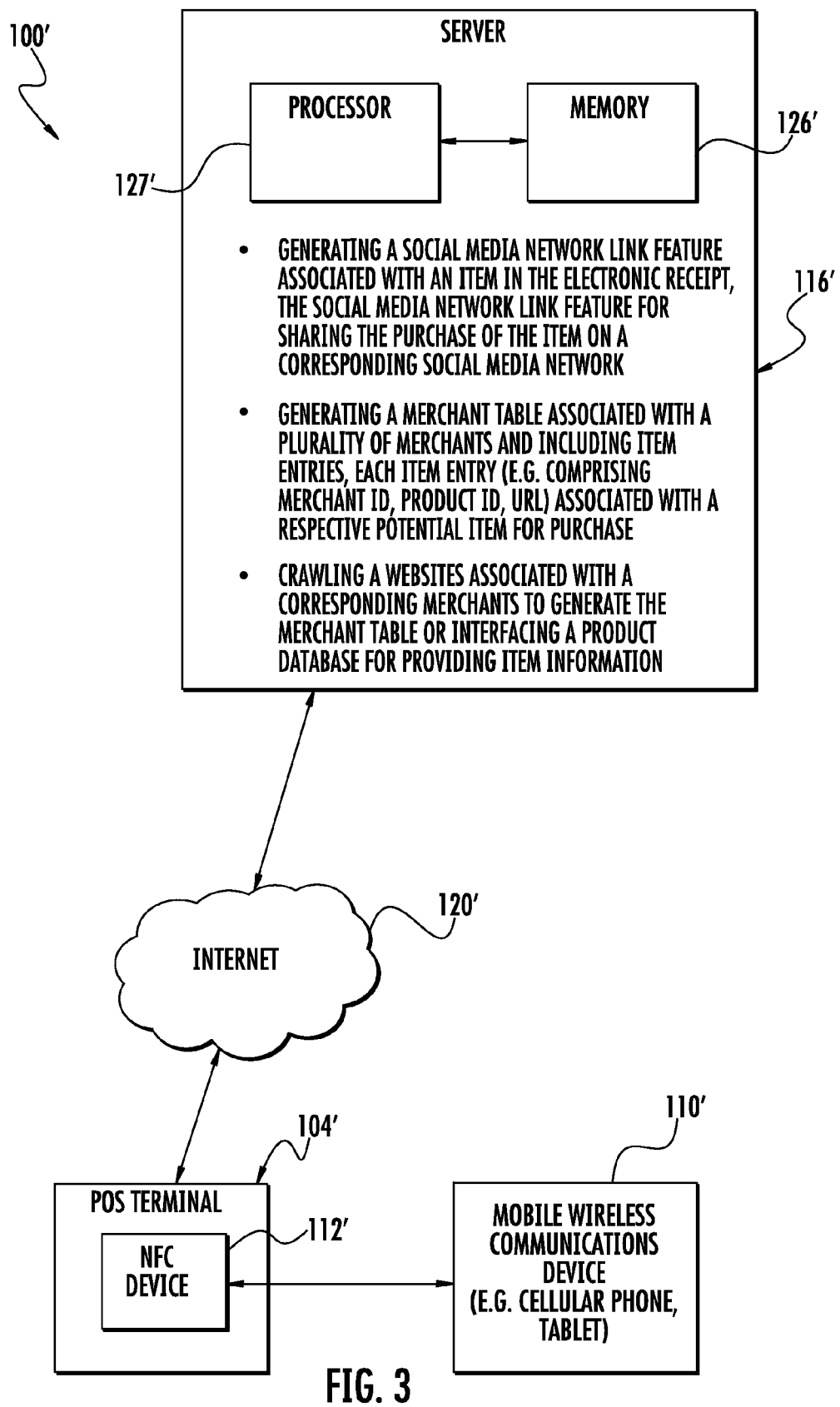
FIG. 3 is a schematic block diagram of another embodiment of the electronic receipt system, according to the present disclosure.
Figure 4:
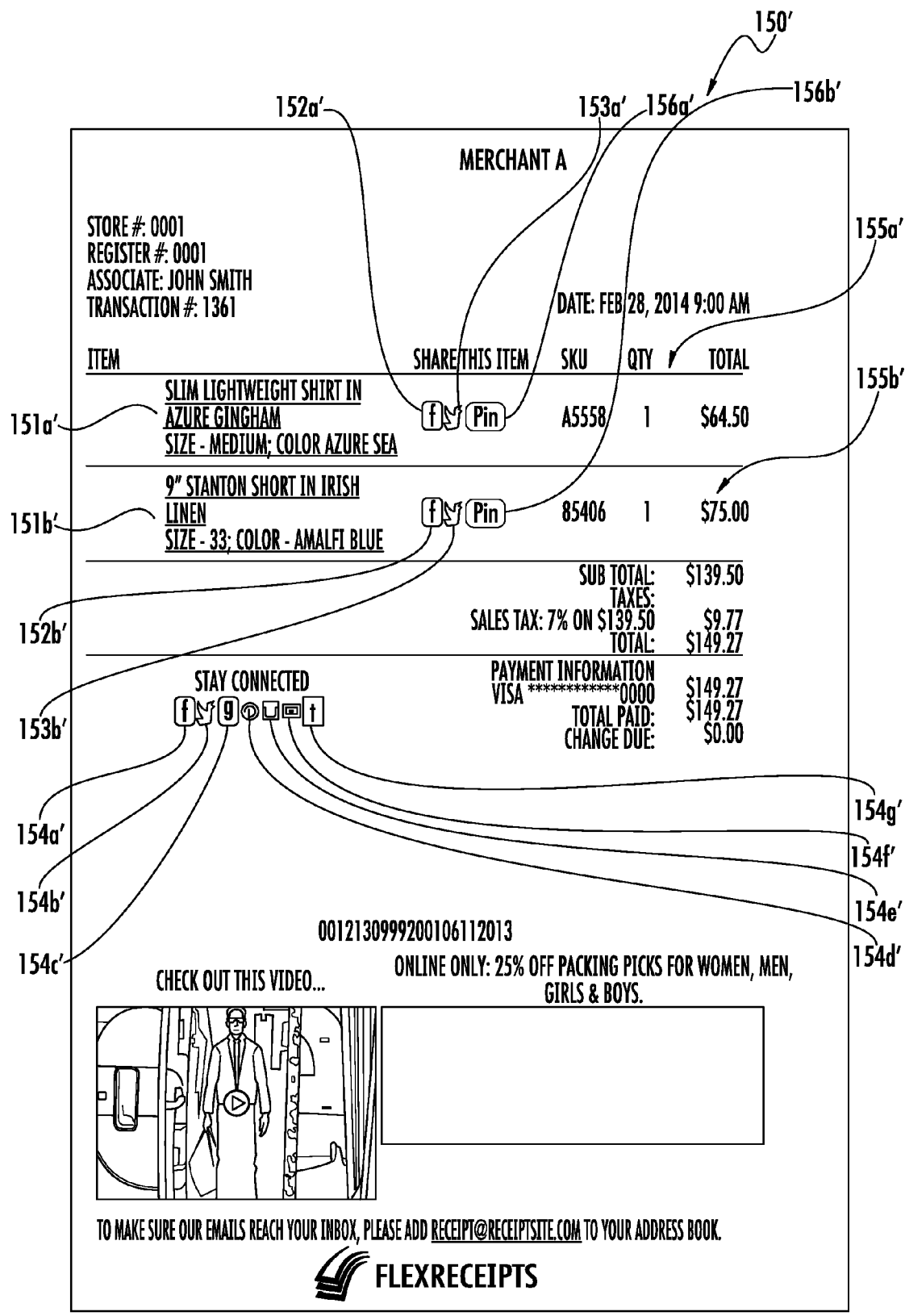
FIG. 4 is a schematic diagram of an electronic receipt for the electronic receipt system of FIG. 3.

Referring now additionally to FIGS. 3-4, another embodiment of the electronic receipt system 100' is now described. In this embodiment of the electronic receipt system 100', those elements already discussed above with respect to FIGS. 1-2 are given prime notation and most require no further discussion herein.

The electronic receipt system 100' illustratively includes a POS terminal 104' having a NFC device 112' for communicating with a mobile wireless communications device 110' during a transaction for purchasing a plurality of items 151a'-151b', and a server 116' communicating with the POS terminal and comprising a processor 127' and memory 126' associated. The processor 127' and memory 126' illustratively receive a user identifier transmitted from the mobile communication device 110' via the NFC device 112', and verify an enrollment status of the user identifier, based upon results of the verifying, generate an electronic receipt 150' associated with the transaction, The processor 127' and memory 126' illustratively generate a plurality of social media network link features 155a'-155b' in the electronic receipt 150' and associated with the plurality of items 151a'-151b'. The social media network link features 155a'-155b' are for sharing the purchase of the items 151a'-151b' on a corresponding plurality of social media networks (e.g., Google+, Facebook, Twitter, Instagram, Pinterest, Blog etc.). In particular, each social media network link feature 155a'-155b' illustratively includes first and second share links (e.g., in the illustrated embodiment, buttons) 152a'-152b', 153a'-153b', 156a'-156b' for sharing the purchase of each respective item 151a'-151b' on the associated social media network.

In some embodiments, the processor 127' and memory 126' may be for generating a merchant table associated with a plurality of merchants. The merchant table may include a plurality of item entries, each item entry associated with a respective potential item for purchase. The generating of the merchant table may comprise crawling a plurality of websites associated with a corresponding plurality of merchants, and/or interfacing with a Product Database (i.e., Merchant Product Database, Manufacturer Product Database) that provides item information. Each item entry may comprise, for example, a product identification number for the respective potential item for purchase, a merchant identification number for a merchant selling the respective potential item for purchase, and a URL for accessing the respective potential item for purchase on a website of the merchant selling the respective potential item. In addition to viewing the item for purchase, this feature also allows merchants to share additional information about that product/service on the website as well as other recommended products for further upsell opportunities.

Additionally, the generating of the plurality of social media network link features 155a'-155b' illustratively includes searching the merchant table for at least one item entry associated with the plurality of items 151a'-151b'. The social media network link features 155a'-155b' illustratively include links 154a'-154g' to a social media page for a merchant associated with the transaction. In the illustrated embodiment, the links 154a'-154g' to the social media page are for a single merchant, but in other embodiments where there are more than one merchant for the transaction, the links to the social media page would comprise corresponding links for each merchant (i.e. each social media network link feature comprising an individual link to the social media page for a respective merchant). Also, the first social media network link feature 155a' may include an image of the respective item 151a'. As discussed in more detail herein, this image may be derived from the website of the respective merchant.

Another aspect is directed to a server 116' in communication with a POS terminal 104' having an NFC device 112' for communicating with a mobile wireless communications device 110' during a transaction for purchasing at least one item 151a'-151b'. The server 116' may include a processor 127' and memory 126' associated therewith for receiving a user identifier transmitted from the mobile communication device 110' via the NFC device 112', verifying an enrollment status of the user identifier, based upon results of the verifying, generating an electronic receipt 150' associated with the transaction, and generating at least one social media network link feature 155a'-155b' associated with the at least one item 151a'-151b' in the electronic receipt, the at least one social media network link feature for sharing the purchase of the at least one item on a corresponding at least one social media network.

Another aspect is directed to a method for operating an electronic receipt system 100' comprising a POS terminal 104' having a NFC device 112' for communicating with a mobile wireless communications device 110' during a transaction for purchasing at least one item 151a'-151b', and a server 116' communicating with the POS terminal. The method may include using a processor 127' and memory 126' associated therewith for receiving a user identifier transmitted from the mobile communication device 110' via the NFC device 112', using the processor and memory associated therewith for verifying an enrollment status of the user identifier, and using the processor and memory associated therewith for based upon results of the verifying, generating an electronic receipt 150' associated with the transaction. The method may include using the processor 127' and memory 126' associated therewith for generating at least one social media network link feature 155a'-155b' associated with the at least one item 151a'-151b' in the electronic receipt 150', the at least one social media network link feature for sharing the purchase of the at least one item on a corresponding at least one social media network.

In the following, an exemplary discussion of the electronic receipt system 100, 100' with Item-Level and Transaction-Level social media network link features is now described.

Assumptions
1. The flexReceipts application refers to the flexReceipts Web application, Web Service application, Messaging application, Batch Processing application, Crawling application etc.
2. Either the SKU, UPC, and/or any other unique product identifier field on a receipt can be used to identify a product page in a merchant e-commerce site.
3. The merchant's e-commerce site product pages are well structured (i.e., product IDs, descriptions and images can be extracted in a predictable fashion).

Transaction-Level Social Media Design
Brief Design Summary:
1. Create a table, which maintains relationship between merchants and various social media URLs. The table can contain 3 columns at a minimum:
   a. Merchant ID
   b. Social Media Type
   c. Merchant Site URL
2. Add a column to the merchant table where the merchant can specify the tag line to be displayed above their social media badges.
3. Create a page on the merchant portal for merchants to manage their social media sites and taglines.
4. Update the email and print receipt templates to render social media badges for each site defined by merchants. Additionally, render the tagline above the badges.

Item-Level Social Media Design
The requirements for item-level social media links involve adding at least the following links for each item on a receipt:
1. Facebook Share Button
2. Tweet Button
3. Pin It Button Facebook, Twitter and Pinterest APIs collectively require the following information in order to render the links:
1. URL of product page for item.
2. Image of product.
3. Description of product.

The implementation of the item-level social media feature may include two components:
1) Product Database—build a database of product information to be used by the social media links.
2) Social Media Link Rendering—render the item-level social media links on emails and printed receipts.

Product Database
The Product Database (PD) can be built by crawling merchant e-commerce sites, and/or interfacing with a Product Database (i.e., Merchant Product Database, Manufacturer Product Database) that provides item information. This requires the addition of several new components to the flexReceipts architecture:
1. Product Database Schema—a schema to host the product data.
2. Product Database Web Crawler—an application that crawls merchant e-commerce sites based upon the provided parameters. Information is extracted from product pages as the site is crawled. The information is stored in the PD using the transfer protocol endpoints.
3. Product Database Endpoints—these are transfer protocol endpoints to access the PD. They support CRUD operations to resources stored in the Product Database.

Product Database Schema
This schema can be created in an existing database, or any new database and support three domains:
1. Products—with a key of Product ID and Merchant ID
   a. Each product maintains the data required to present social media for an item.
   b. The product field also contains a rank which provides the level of validity of the data.
2. Pages—with a key of Page URL and Merchant ID
   a. Each page maintains the data which was extracted from the page e.g., image URL, description, etc.
   b. Each page has a rank which is calculated based upon numerous factors, including but not limited to:
      i. Product description on page.
      ii. Image URL on page.
      iii. Number of links on page.
3. Merchants—merchant specific info such as:
   a. Merchant ID.
   b. Root page for the merchant's e-commerce site.
   c. Crawling schedule.
   d. Criteria utilized to extract information from pages.

The following list summarizes example schema tables:
1. PD_PRODUCT—maintains product data (See Table 1).
2. PD_PAGE—maintains crawled product pages (See Table 2).
3. PD_MERCHANT—maintains merchants in the product database (See Table 3).

TABLE 1

| Column Name | Description | Column Type | Primary Key | Foreign Key | Nullable |
|---|---|---|---|---|---|
| ID | Unique ID (generated) | Number | Yes | | False |
| PRODUCT_ID | The ID for the product as defined by the merchant | VARCHAR | No | | False |
| PD_MERCHANT_ID | The merchant to which the product belongs | Number | No | PD_MERCHANT | False |
| PD_PAGE_ID | Foreign key reference to the crawled product page from which the data was gathered | Number | No | PD_PAGE | True |
| PAGE_URL | URL of the page for this product | VARCHAR | No | | False |
| IMG_URL | URL of an image of the product | VARCHAR | No | | True |
| DESC | Description of the product | VARCHAR | No | | True |
| RANK | A score of the product data, based on several factors | Number | No | | False |
| MAX_RANK | The maximum rank of all crawled pages associated with the product | Number | No | | False |
| MIN_RANK | The minimum rank of all crawled pages associated with the product | Number | No | | False |
| TOT_PAGES | The total number of all pages associated with the product | Number | No | | False |
| EXP_DATE | The date the product data will be considered expired | Timestamp | No | | False |
| CREATED_DATE | The date the record was created | Timestamp | No | | False |
| LAST_UPDATED_DATE | The date the record was last updated | Timestamp | No | | False |

TABLE 2

| Column Name | Description | Column Type | Primary Key | Foreign Key | Nullable |
|---|---|---|---|---|---|
| ID | UniqueID (generated) | Number | Yes | | False |
| PD_PRODUCT_ID | Foreign key reference to PD_PROD | Number | No | PD_PROD | False |
| URL | URL of the page | VARCHAR | No | PD_MERCHANT | False |
| IMG_URL | URL of an image of the product | VARCHAR | No | | True |
| DESC | Description of the product | VARCHAR | No | | True |
| RANK | A score of the product data, based on several factors | Number | No | | False |
| NUM_LINKS | The number of links on the page | Number | No | | False |
| EXP_DT | The expiration date for the crawled data | Timestamp | No | | False |
| CREATED_DATE | The date the record was created | Timestamp | No | | False |
| LAST_UPDATED_DATE | The date the record was last updated | Timestamp | No | | False |

TABLE 3

| Column Name | Description | Column Type | Primary Key | Foreign Key | Nullable |
|---|---|---|---|---|---|
| ID | Unique ID (generated) | Number | Yes | | False |
| MERCHANT_ID | Merchant ID of the merchant | VARCHAR | No | | False |
| ECOM_ROOT_PAGE | The root page of the merchant's e-commerce site | VARCHAR | No | | False |
| CRAWL_SCHED | Defines crawler schedule | VARCHAR | No | | False |
| PROD_ID_EXTRCT_JS | CSS Selector for Product ID | VARCHAR | No | | False |
| PRODUCT_TYPE | Product ID Type - (e.g., SKU, UPC) | VARCHAR | No | | False |
| DATA_XTRCT_MTHD | The method by which data should be extracted from product pages | VARCHAR | No | | False |
| OEMBED_ENDPOINT | Endpoint URL for the merchant's oEmbed server | VARCHAR | No | | True |
| IMG_EXTRCT_JS | Code which can be executed on a webpage to extract the Product Image | VARCHAR | No | | True |
| DSCR_EXTRCT_JS | Code which can be executed on a webpage to extract the Product Description | VARCHAR | No | | True |
| PRODUCT_DATA_DAYS_VALID | Number of days for which crawled data is considered valid | Number | No | | False |
| CREATED_DATE | The date the record was created | Timestamp | No | | False |
| LAST_UPDATED_DATE | The date the record was last updated | Timestamp | No | | False |

Product Database Crawler

This component is responsible for crawling through a merchant's e-commerce site based upon a merchant-specific configuration. The configuration settings include:
1. Root E-Commerce Page—the root page for the merchant's site; the starting point for the crawl.
2. Product ID Extractor—code which can be executed on a Product webpage to obtain the Product ID for the product.
3. Data Extraction Method—identifies the method by which product data can be extracted from a page. For example:
   a. oEmbed—This option is the most reliable but, requires the merchant have an oEmbed endpoint.
   b. Facebook Open Graph Meta Tags—Merchants use Facebook Open Graph meta tags to add metadata to pages that can be used when users perform Facebook-related actions on a page e.g., Like, Share, etc. Some relevant meta tags include:
      i. og:image—The URL of an image which is used in stories published about this object; this is often an image of the product.
      ii. og:description—A short description or summary.
   c. Custom Merchant Code—The merchant (or an administrator) defines custom code which when executed on a Product Webpage retrieves at least the following information:
      i. Product Image
      ii. Product Description
4. Schedule—Defines how often the crawl should be performed; this may also incorporate a timeout.

The Crawler application can be made up of three components: the Spider, the Scheduler and the Manager.

Spider

A command-line application which takes as parameters:
1. The Merchant ID of the merchant for whom the crawl is being performed.
2. The URL of the PD Endpoint.
3. The credentials to be used for the Endpoint.

The application uses the PD Endpoint to retrieve the Crawler configuration for the merchant and also update the PD. Multiple instances of this component can be executed concurrently to support the crawling of websites with a large number of pages.

Scheduler

This component's primary responsibility is to issue requests to Managers to perform a crawl requests for merchants based upon a schedule.

Manager

There can be multiple instances of this component to support scaling. It is responsible for the following:
1. Initiating the execution of the Spider application including providing required execution parameters.
2. Recording the status of each Spider execution in the Product Database.
3. Enforcing a configurable limit on the number of concurrent Spider instances which can be executed.
4. Evaluating the rank of a page.
   a. The rank can be evaluated based upon the following factors:
      i. Whether a product image is found on the page.
      ii. Whether the image meets the dimensions required.
      iii. Whether a description is found on the page.
      iv. Whether the product ID is included in the product URL.

b. Once the rank is calculated, compare the page rank to the rank of the corresponding product.

c. If the page rank is higher than the product rank, update the product with data from the page.

Product Database Endpoint

The Endpoints for the Product Database provide the ability to perform CRUD actions on the various Product Database Resources.

The CRUD operations for the Merchants and Products resources are standard operations that insert, select, update or delete data from the Product Database. The CRUD operations for the Pages resource perform the same operations but, also trigger additional business logic:

1. Create—This asynchronously triggers the Manager component to evaluate the rank of a page and determine whether it should be added. A page may only be added if the total number of pages crawled for the product is not greater than the limit defined for the merchant. If the limit would be exceeded, the page may only be added if its rank is greater than the min page rank for the product. Additionally, the pages with the previous min rank may be deleted and the min rank for the product should be updated.

2. Update—This updates an existing page for the product into the Product Database; it also asynchronously triggers the page rank to be evaluated by the Manager component of the crawler application.

3. Delete—This deletes an existing page for a product from the Product Database; it also asynchronously triggers the product rank to be evaluated.

Social Media Link Rendering

Social Media links need to be rendered for items in the email and print context.

At the time of rendering:

1. For each item on the receipt:
   a. Query the product table by Product ID and Merchant ID. The query may leverage caching.
   b. Inspect the data and determine which Social Media links can be rendered. For example:
      i. FaceBook—Requires URL.
      ii. Pinterest—Requires Product Image and Description; additionally, the image must be at least 100px in one dimension (height or width) and at least 200px in the other dimension.
      iii. Twitter—Requires a URL.
   c. Render the appropriate links.
   d. If the product data is expired, request the pages for the product to be crawled.

Background and Scope

This feature focuses on adding interactive features to digital receipts; specifically including social media widgets defined at the item and transaction level.

For example, at the item-level, end users can:

1. "Share" an item on Facebook services
2. "Tweet" the item using Twitter services
3. "Pin" the item using Pinterest services At the transaction or receipt level, end users can visit the various social media homepages belonging to the merchant including but not limited to:

1. FaceBook
2. Twitter
3. Pinterest
4. Instagram
5. Google+
6. YouTube
7. Tumblr
8. Vine
9. Snapchat
10. Blogs
11. TripAdvisor Business Requirements The following summarizes the requirements:

1. Item Level Social Media: The following capabilities can be implemented for items on receipts in the email and print contexts:
   a. Provide a "button" that allows the user to "Share" the item on Facebook. "The Share button lets people add a personalized message to links before sharing on their timeline, in groups, or to their friends via a Facebook Message."
      i. The Facebook share "button" requires a URL to be shared.
      ii. The URL "shared" corresponds to the product page for the item on the merchant's e-commerce site.
   b. Provide a "button", which allows the user to "Tweet" the item.
      i. Clicking the "button" opens in a new window a Tweet page with a pre-populated message that includes a URL and customizable message from merchant.
      ii. The URL in the tweet corresponds to the product page for the item on the merchant's e-commerce site.
      iii. A default message, that can be changed, is be pre-populated in the Tweet.
      iv. The maximum Twitter message length is 140 characters.
   c. Provide a "button" that allows the user to "Pin" the item to Pinterest.
      i. "Pinning" the item requires an image for the item (specified as a URL) and the URL of the page, which contains the image.
      ii. Optionally, the description to be associated with the "pinned" item can be pre-populated and changed.
      iii. The image, URL and description can all be derived from the product page for the item on, the merchant's e-commerce site.
   d. All buttons adhere to the branding standards of Facebook, Twitter and Pinterest.
   e. The product image displays on each item line.
   f. The item links to the product page on the merchant's e-commerce site.

2. Transaction Level Social Media: The following capabilities can be implemented for receipts in the email and print contexts:
   a. When viewing a receipt, users can click on links that open the merchant's various social media sites.
   b. Merchants can specify the URLs for their various social media sites on a new page in the merchant portal. The merchant can specify URLs for their various social media pages including but not limited to Facebook, Twitter, Pinterest, Instagram, Google+, YouTube, and Blog. If no URL is specified for a particular social media site, a social media page for the site is not displayed on the receipt.
   c. The links can appear as badges, which adhere to the branding standards of those social media sites.
   d. Merchants can specify a custom tagline to be displayed above the social media badges (e.g. "Stay Connected").

Technical Requirements

The following summarizes the technical requirements for each major business requirement:

1. Implement Item Level Social media for Facebook, Pinterest, Twitter etc.
   a. The Facebook, Twitter and Pinterest APIs collectively require the following information in order to render the links:

i. URL of product page for item on merchant e-commerce site.
  ii. Image of product from the product page of the merchant e-commerce site.
  iii. Description of product from the product page of the merchant e-commerce site.
  b. The primary source for this data can be the merchant's e-commerce website. Another source for this data can be a merchant's product database.
  c. A social media link can only be rendered if the required information is available. Therefore, it may be possible for some items on a receipt to not have any or all-social media links.
1. For item-level tweets, the merchant can specify the customizable message from a new page on the merchant console. If no message is specified, a default one can be used.
2. If the social media data required for a given item cannot be obtained from the merchant's e-commerce site the product description and product image can be obtained from another site such as a manufacturer site. In another embodiment, the social media data required for a given item can be directly obtained from interfacing with a Product Database (i.e., Merchant Product Database, Manufacturer Product Database) that provides item information. In this case, the electronic receipt system can utilize API calls to retrieve the necessary social media data for an item.

Implementation

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network (LAN) and a wide area network (WAN), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

In some cases, the modules of the electronic receipt system are implemented as web services using transfer protocols such as SOAP (Simple Object Access Protocol) or REST over HTTP (Hypertext Transfer Protocol), JMS (Java Message Service), or other standard protocols.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An electronic receipt system comprising:
  a point-of-sale (POS) terminal having a near field communication (NFC) device for communicating with a mobile wireless communications device during a transaction for purchasing a plurality of items; and
  a server communicating with said POS terminal and comprising a processor and memory associated therewith for
    generating a product database comprising a plurality of item entries for a corresponding plurality of potential items for purchase, each item entry comprising a merchant identification number for a merchant selling a respective potential item for purchase, and a locator value for accessing the respective potential item for purchase on a website of the merchant selling the respective potential item for purchase, receiving a user identifier transmitted from the mobile communication device via said NFC device, verifying an enrollment status of the user identifier, based on results of the verifying, generating an electronic receipt associated with the transaction for purchasing the plurality of items, and generating a plurality of social media network link features in the electronic receipt and respectively associated with the plurality of items using the product database, each social media network link feature for sharing a purchase of a respective item on a corresponding at least one social media network, the generating comprising checking, for each social media network link feature, whether a respective item entry in the product database includes required data to generate a respective social media network link feature for the corresponding at least one social media network.

2. The electronic receipt system of claim 1 wherein each item entry comprises a product identification number for the respective potential item for purchase; and wherein the locator value comprises a uniform resource locater (URL).

3. The electronic receipt system of claim 1 wherein the generating of the plurality of social media network link features comprises searching the product database for the respective item entry associated with the respective item.

4. The electronic receipt system of claim 1 wherein the generating of the product database comprises crawling a plurality of websites associated with a corresponding plurality of merchants.

5. The electronic receipt system of claim 1 wherein each social media network link feature comprises a link to a social media page for a merchant associated with the transaction.

6. The electronic receipt system of claim 1 wherein each social media network link feature comprises an image of each item.

7. A server in communication with a point-of-sale (POS) terminal having a near field communication (NFC) device for communicating with a mobile wireless communications device during a transaction for purchasing a plurality of items, the server comprising:

a processor and memory associated therewith for
    generating a product database comprising a plurality of item entries for a corresponding plurality of potential items for purchase, each item entry comprising a merchant identification number for a merchant selling a respective potential item for purchase, and a locater value for accessing the respective potential item for purchase on a website of the merchant selling the respective potential item for purchase,
    receiving a user identifier transmitted from the mobile communication device via the NFC device,
    verifying an enrollment status of the user identifier,
    based upon results of the verifying, generating an electronic receipt associated with the transaction for purchasing the plurality of items, and
    generating a plurality of social media network link features in the electronic receipt and respectively associated with the plurality of items using the product database, each social media network link feature for sharing a purchase of a respective item on a corresponding at least one social media network, the generating comprising checking, for each social media network link feature, whether a respective item entry in the product database includes required data to generate a respective social media network link feature for the corresponding at least one social media network.

8. The server of claim 7 wherein each item entry comprises a product identification number for the respective potential item for purchase; and wherein the locator value comprises a uniform resource locater (URL).

9. The server of claim 7 wherein the generating of the plurality of social media network link features comprises searching the product database for the respective item entry associated with the respective item.

10. The server of claim 7 wherein the generating of the product database comprises crawling a plurality of websites associated with a corresponding plurality of merchants.

11. The server of claim 7 wherein each social media network link feature comprises a link to a social media page for a merchant associated with the transaction.

12. The server of claim 7 wherein each social media network link feature comprises an image of each item.

13. A method for operating an electronic receipt system comprising a point-of-sale (POS) terminal having a near field communication (NFC) device for communicating with a mobile wireless communications device during a transaction for purchasing a plurality of items, and a server communicating with the POS terminal, the method comprising:

using a processor and memory associated therewith for generating a product database comprising a plurality of item entries for a corresponding plurality of potential items for purchase, each item entry comprising a merchant identification number for a merchant selling a respective potential item for purchase, and a locater value for accessing the respective potential item for purchase on a website of the merchant selling the respective potential item for purchase;

using the processor and memory associated therewith for receiving a user identifier transmitted from the mobile communication device via the NFC device;

using the processor and memory associated therewith for verifying an enrollment status of the user identifier;

using the processor and memory associated therewith for based upon results of the verifying, generating an electronic receipt for purchasing the transaction associated with the plurality of items; and using the processor and memory associated therewith for generating a plurality of social media network link features in the electronic receipt and respectively associated with the plurality of items using the product database, each social media network link feature for sharing a purchase of a respective item on a corresponding at least one social media network, the generating comprising checking, for each social media network link feature, whether a respective item entry in the product database includes required data to generate a respective social media network link feature for the corresponding at least one social media network.

14. The method of claim 13 wherein each item entry comprises a product identification number for the respective potential item for purchase; and wherein the locator value comprises a uniform resource locater (URL).

15. The method of claim 13 wherein the generating of the plurality of social media network link features comprises searching the product database for the respective item entry associated with the respective item.

16. The method of claim 13 wherein the generating of the product database comprises crawling a plurality of websites associated with a corresponding plurality of merchants.

17. The method of claim 13 wherein each social media network link feature comprises a link to a social media page for a merchant associated with the transaction.

18. The method of claim 13 wherein each social media network link feature comprises an image of each item.

* * * * *